United States Patent [19]

Kightlinger et al.

[11] Patent Number: 4,558,100

[45] Date of Patent: Dec. 10, 1985

[54] ABSORBENT COMPOSITIONS

[75] Inventors: Adrian P. Kightlinger, Muscatine; E. Daniel Hubbard, West Liberty, both of Iowa

[73] Assignee: Grain Processing Corporation, Muscatine, Iowa

[21] Appl. No.: 627,444

[22] Filed: Jul. 3, 1984

[51] Int. Cl.$^4$ .............................................. C08F 8/44
[52] U.S. Cl. ............................ 525/329.1; 525/329.2; 525/329.3; 525/369
[58] Field of Search ............... 525/329.1, 329.2, 329.3, 525/369

[56] References Cited

U.S. PATENT DOCUMENTS

| | | | |
|---|---|---|---|
| 2,625,471 | 1/1953 | Mowry et al. | 71/1 |
| 2,625,529 | 1/1953 | Hedrick et al. | 260/41 |
| 2,861,059 | 11/1958 | Mowry et al. | 260/85.5 |
| 2,922,768 | 1/1960 | Mino et al. | 260/17.4 |
| 3,661,815 | 5/1972 | Smith | 260/17.4 |
| 3,980,663 | 9/1976 | Gross | 525/329.6 |
| 3,997,515 | 12/1976 | Kosaka et al. | 525/369 |
| 4,021,484 | 5/1977 | Toda et al. | 525/369 |
| 4,107,121 | 8/1978 | Stoy | 264/182 |
| 4,116,899 | 9/1978 | Fawta et al. | 260/881 |
| 4,337,328 | 6/1982 | Holst et al. | 525/369 |
| 4,340,706 | 7/1982 | Obayashi et al. | 526/207 |
| 4,357,437 | 11/1982 | Huhn et al. | 524/458 |

FOREIGN PATENT DOCUMENTS 95425  1/1959  Czechoslovakia .

*Primary Examiner*—Joseph L. Schofer
*Assistant Examiner*—Bernard Lipman
*Attorney, Agent, or Firm*—Neuman, Williams, Anderson & Olson

[57] ABSTRACT

A substantially water-insoluble solid liquid-absorbing composition comprising an alkali metal salt of an aqueous alcoholic alkali saponified cross-linked homopolymer of acrylonitrile or methacrylonitrile and the process for the preparation thereof.

25 Claims, No Drawings

ABSORBENT COMPOSITIONS

This invention relates to compositions which have the ability to absorb substantial amounts of aqueous liquids. More specifically, this invention describes products having improved rates of absorbency and/or increased total absorbencies and provides for their preparation.

Compositions which are capable of absorbing large amounts of liquids find numerous uses. For example, such absorbents are used to form absorbent products such as sanitary napkins, incontinent pads, disposable bed pads, diapers, wound dressings, surgical drapes, etc. Liquid absorbing compositions also find use in fuel filters, seed coatings, batteries, freezer packs and other applications.

Because of their wide usefulness, it is a principal object of this invention to provide improved compositions which absorb large quantities of liquids at a rapid rate.

Water absorbing alkali metal salts of saponified granular starch-polyacrylonitrile (S-PAN) graft copolymers are disclosed in U.S. Pat. No. 3,661,815. These products are prepared by saponifying starch-polyacrylonitrile graft copolymers in an aqueous alcoholic solution of an alkali metal base. These materials are substantially water-insoluble granular products having the capacity to absorb aqueous liquids. Because of their absorbing characteristics, the products disclosed in that prior patent have been utilized commercially in a wide variety of applications.

Water-soluble superabsorbents prepared by saponifying polyacrylonitrile (PAN) are described in U.S. Pat. No. 2,861,059. Although saponified polyacrylonitrile has somewhat greater up-takes when compared to the variously described grafts, they have not been a commercial success because of their slow absorption characteristics and high water solubles content.

The object of this invention is to prepare a superabsorbent having a rapid absorbency rate.

In addition, it is an object of this invention to prepare a superabsorbent having increased total absorbency.

Furthermore, it is an object of this invention to prepare substantially water-insoluble superabsorbents having one or more of the above described desirable characteristics.

We have found that compositions which exhibit the capacity to absorb substantial quantities of aqueous liquids, including body fluids, at a rapid rate can be produced by treating an aqueous mixture of acrylonitrile (or methacrylonitrile) and a polyfunctional monomeric cross-linking agent with a polymerization initiator to achieve polymerization and cross-linking of the acrylonitrile. The resultant cross-linked polyacrylonitrile is then saponified using an aqueous alcoholic solution of an alkali metal base, recovered by washing with an alcohol and filtering, and finally dried to obtain the solid granular superabsorbent. As used herein, a superabsorbent is a material capable of absorbing substantial quantities of a liquid, i.e. more than 15 parts liquid per part thereof.

The polyfunctional cross-linking agents used in combination with acrylonitrile to form liquid absorbents in accordance with this invention are of the type that contain a plurality, that is, two or more, of terminal polymerizable ethylenic ($CH_2=C<$) groups per molecule. Examples of such cross-linking agents are N,N'-methylene-bis-acrylamide, N,N'-methylene-bis-methacrylamide, diallyl amine, diallyl acrylamide, diallyl methacrylamide, diallyl ether, diallyl methyl ether, divinyl benzene, diethylene glycol divinyl ether, ethylene glycol diacrylate, ethylene glycol dimethacrylate, propylene glycol diacrylate, propylene glycol dimethacrylate, diethylene glycol diacrylate, diethylene glycol dimethacrylate, tetraethylene glycol diacrylate, tetraethylene glycol dimethacrylate, allyl acrylate, allyl methacrylate, trimethylolpropane triacrylate, trimethylolpropane trimethacrylate, 1,6 hexanediol diacrylate, pentacrythritol triacrylate, glyceryl/propoxy triacrylate and the like. A preferred cross-linking agent is N,N'-methylene-bis-acrylamide.

The level of cross-linking may be varied to suit specific requirements, however cross-linking agent use levels can vary from about 0.03 to 5.0% (by weight based on monomer). The preferred cross-linking agent use level range is from about 0.05 to 2.0% (by weight on monomer). The cross-linking monomer can be added before the polymerization is initiated or at the end of the exotherm following the initiation of the polymerization or it can be incorporated at both times. It can also be added continuously throughout the polymerization.

The polymerization initiator can be any of the agents known to catalyze the polymerization of acrylonitrile or methacrylonitrile. Such polymerization initiators include ceric salts as disclosed in U.S. Pat. No. 2,922,768, such as, for example, ceric nitrate, ceric sulfate, ceric ammonium nitrate, ceric ammonium sulfate, ceric ammonium pyrophosphate, ceric iodate, ceric salts of organic acids, e.g., cerium naphthenate and cerium linoleate and the like. These compounds may be employed singly or in combination with one another. Ceric compounds which are capable of forming ceric salts in situ under the acid conditions of the polymerization reaction such as ceric oxide, ceric hydroxide and the like may be used.

Other polymerization initiators or oxidizing agents include organic peroxides, inorganic persulfates, perdisulfates, peroxides, percarbonates, perborates or chlorates and the like. If a redox catalyst system is used, representative reducing agents that can be used with the above oxidizing agents include sulfoxy compounds such as the bisulfites, metabisulfites and sulfinic acids. Some redox catalyst systems also utilize a multivalent metal ion (promoter) in conjunction with the oxidizing and reducing agents. Representative promoters include the ions or iron, thorium, vanadium, nickel, chromium, copper, cobalt, etc. The promoters are usually added to the aqueous monomer medium in one of their water-soluble salt forms, such as, ferrous ammonium sulfate.

The preferred initiator system is an ammonium persulfate-sodium metabisulfite-ferrous ammonium sulfate combination of initiator, reducing agent and promoter. Initiator use levels are dependent upon the specific initiator employed; use levels can, in general, range from about 0.01 to 10.0% (by weight based upon monomer). If a reducing agent is used in conjunction with the catalyst (oxidizing agent), it is generally used in a molar equivalent amount to that of the oxidizing agent. If a promoter is used with the redox catalyst system, it is generally used in amounts ranging from 0.001 to 0.100% (by weight based upon monomer).

The preferred initiator system use level is from about 0.05 to 1.00% ammonium persulfate, about 0.04 to 0.83% sodium metabisulfite and about 0.005 to 0.05% ferrous ammonium sulfate (by weight based upon monomer).

In certain instances, and as an optional embodiment, the addition of a surfactant to the polymerization mix prior to initiation of polymerization results in increased reaction efficiencies, reduced coagulum and improved absorption characteristics. Representative of anionic surface active agents are the alkyl sulfates, alkyl aryl sulfonates such as alkyl benzene sulfonates, monoglyceride sulfates, sulfoethyl oleates, sulfoethyl-N-methyl oleic amides, fatty acid soaps such as sodium stearate and the like. Representative nonionic surfactants include polyglycol ether type surfactants; polyalkylene oxide derivatives of phenolic compounds such as dibutyl and diamyl phenols and cresols, heptyl, octyl, nonyl, decyl phenols and cresols; polyalkylene oxide derivatives of aliphatic organic hydroxy compounds and carboxy compounds; polyalkylene oxide derivatives of carboxylic acid amides and of sulfoamides; Aerosol 22 (tetrasodium-N-(1,2-dicarboxyethyl)-N-octadecyl sulfosuccinamate; American Cyanamide Co., Wayne, N.J.), Span 20 (sorbitan monolaurate; ICI Americas, Inc., Wilmington, De.), Span 40 (sorbitan monopalmitate; ICI Americas, Inc., Wilmington, De.), Span 60 (sorbitan monooleate; ICI Americas, Inc., Wilmington, De.), Sipex EST-30, (sodium tridecyl ether sulfate; Alcolac, Inc., Baltimore, Md.), etc. A preferred surfactant is Aerosol 22. Surfactant use levels will vary depending upon the type of surfactant employed and the end use of the resultant superabsorbent. Surfactant use levels can range from about 0.1 to 10.0% (by weight based upon monomer). The preferred range is about 0.25 to 6.0% (by weight based upon monomer).

The polymerization of the acrylonitrile or methacrylonitrile is so conducted that the polymerization is essentially completed within 60 minutes at temperatures ranging from about 0° C. to 100° C. and preferably from about 15° C. to 80° C. for maximum efficiency and at an acidic pH, preferably less than about 4. Thus, according to one specific preferred embodiment, a cross-linked polyacrylonitrile homopolymer intermediate of this invention can be prepared by:

(1) preparing in a suitable reactor equipped with an agitator an aqueous mixture consisting of about 2–40% and preferably 5–25% acrylonitrile based upon the water,
(2) adding to said aqueous mixture prior to or subsequent to initiation of polymerization from about 0.03 to 5.0% and preferably 0.05 to 2.0% N,N'-methylenebis-acrylamide (by weight based upon acrylonitrile),
(3) adding to the above aqueous mixture 0.005 to 0.05% ferrous ammonium sulfate (by weight based upon acrylonitrile),
(4) adjusting the reaction mixture to pH 1–4 and preferably 2.5–3.5 using hydrochloric acid,
(5) adding to the acidic aqueous mixture about 0.05–1.0% ammonium persulfate and about 0.04–0.83% sodium metabisulfite (by weight based upon acrylonitrile),
(6) allowing the polymerization reaction to proceed until the exothermic temperature is about 50°–75° C., and
(7) holding said reaction mixture at the exothermic temperature for a period of about 0.1 to 3 hours and preferably 0.3 to 2 hours.

The resultant aqueous cross-linked polyacrylonitrile slurry is saponified by any convenient method whereby the cross-linked homopolymer is intimately contacted with the aqueous alcoholic solution of the saponifying base.

A variety of water-soluble alcohols may be used in the saponification process. Examples are methanol, ethanol, isopropanol, propanol, etc. The preferred alcohol is methanol. Alcohol use levels are expressed in terms of the water/alcohol ratio (by weight). Acceptable ranges are 80/20 to 10/90. The preferred water/alcohol range if 60/40 to 25/75 (by weight).

Suitable bases for saponification include sodium hydroxide, potassium hydroxide, lithium hydroxide, calcium hydroxide, etc. The preferred bases are sodium hydroxide and potassium hydroxide. Alkali use levels can range from 70–200 mol percent based upon the starting acrylonitrile; the preferred range is 80–160 mol percent.

The saponification reaction can be carried out at temperatures ranging from reflux conditions to 150° C.; the preferred temperature range is 90°–120° C. It should be obvious to anyone skilled in the art that temperatures above the boiling point of the water/alcohol system will necessitate the use of a pressure vessel.

Saponification reaction times are dependent upon the reaction temperature. Typically, the saponification time ranges from about 0.03 to 24 hours; the preferred range is 0.08 to 3 hours.

The resultant saponified polyacrylonitrile homopolymer can be recovered by any convenient procedure that employs (1) washing, (2) solids separating, and (3) drying steps.

Thus, the saponified cross-linked polyacrylonitrile of this invention can be prepared by:
(1) treating an aqueous cross-linked polyacrylonitrile slurry with additional water and/or alcohol—preferably methanol—whereby the water/alcohol ratio (by weight) is within the ranges of 80/20 to 10/90 and preferably 60/40 to 25/75,
(2) adding to said aqueous alcoholic slurry 70–200 mol percent (on starting monomer) and preferably 80–160 mol percent of a water-soluble base, preferably sodium or potassium hydroxide,
(3) heating said alkaline slurry in a suitable vessel to 90°–120° C. to effect saponification, and
(4) recovering said saponified cross-linked polyacrylonitrile by washing with alcohol, separating the solids and drying.

EXAMPLE 1

A. Polymerization

A five-liter glass polymerization reactor equipped with an agitator, thermometer and a condenser is charged with 3,340 grams distilled water. The pH is adjusted to 2.72 with 6N hydrochloric acid and then 20 milliliters of a ferrous ammonium sulfate solution containing 4.8 grams $Fe(NH_4)_2(SO_4)_2.6H_2O$ per liter are added. While the above contents of the reactor are being heated to 35° C., 300 grams of acrylonitrile are added. With the temperature at approximately 35° C., 2.10 grams of ammonium persulfate (dissolved in 20 grams water) and 1.75 grams of sodium metabisulfite (dissolved in 20 grams water) are added. The polymerization initiates within 30 seconds and the ensuing exotherm raises the temperature to 60°–64° C. and is maintained there for one hour. At the end of one hour, the contents of the reactor are cooled to room temperature.

B. Saponification

To a one gallon pressure reactor equipped with an agitator, thermometer and a pressure gauge are added 1,200 grams of the polyacrylonitrile slurry from Step A above, 1,714 grams of anhydrous methanol and 175 grams of aqueous 50% sodium hydroxide. The mixture is heated to approximately 100° C. and maintained at approximately 100° C. for two hours. At the end of the two-hour hold the resulting saponified mixture is cooled to room temperature. The product is recovered in anhydrous methanol, the pH adjusted to 7.8 with 12N hydrochloric acid, the slurry filtered and the wet cake dried overnight in a 60° C. vacuum oven.

EXAMPLE 2

A saponified cross-linked polyacrylonitrile product was prepared by the method set forth in Example 1 with the exception that 0.56 gram of N,N'-methylene-bis-acrylamide (N,N'-MBA; 0.188% based on monomer) was added to the polymerization mixture when the temperature reached 60° C.

The absorbent products prepared as in Examples 1 and 2 were tested for liquid absorbency using a Modified Demand Absorbency Test (MDAT). This test is based on the fact that when exposed to a reservoir of fluid material contained within a saturated urethane sponge maintained at close to saturation by exposure to free liquid, absorbent materials will draw fluid from that reservoir at a gradually decreasing rate until an equilibrium is established between the saturated sponge and the absorbent, depending on the composition of the test fluid. The rate and absorptive capacity at equilibrium can be used as an indication of the liquid absorbing effectiveness of particular absorbents. The test was conducted as follows: 1000 grams of test fluid was added to a 20.3 cm.×20.3 cm.×5.7 cm. square Pyrex baking dish. A 15.2 cm.×15.2 cm.×2.5 cm. urethane sponge is placed in the liquid and kneaded to remove entrapped air. A cotton diaper measuring 34.3 cm.×68.6 cm. was folded to form three layers and placed on top of the saturated sponge and was permitted to become saturated. The absorbent composition to be tested was placed on a piece of 200 mesh nylon cloth (16.5 cm.×16.5 cm.) containing a 10.2 cm. diameter embroidery hoop. The hoop preweighed (with sample) was placed on the saturated cotton diaper supported by the urethane sponge. The hoop containing the absorbent material was removed and weighed at desired time intervals.

Using this test, the rate of absorption is indicated by the liquid absorbed in 0.25 minute and the total absorption is indicated by the liquid absorbed in five minutes.

The common test fluids are distilled water and aqueous 1.0% sodium chloride (wt/vol).

Using the above Modified Demand Absorbency Test the products of Examples 1 and 2 gave the following results:

| Example No. | % N,N'—MBA* | MDAT Values (g absorbed/g of superabsorbent at time | | | |
|---|---|---|---|---|---|
| | | Distilled Water | | Aqueous 1% NaCl (w/v) | |
| | | 0.25 min | 5 min | 0.25 min | 5 min |
| 1 | 0 | 207 | 540 | 39 | 89 |
| 2 | 0.188 | 377 | 582 | 60 | 105 |

*% based on monomer

This invention involves the unexpected discovery that improved absorbent compositions result when cross-linking is introduced into polyacrylonitrile or methacrylonitrile polymers. The improved absorbency is noted with respect to total up-take of liquid and particularly with respect to rate of liquid uptake. In contrast, cross-linking of starch-polyacrylonitrile polymers did not improve the functionality thereof as illustrated in Examples 3 and 4.

EXAMPLE 3

A. Polymerization

Into a five-liter, glass polymerization reactor equipped with an agitator, thermometer and a condenser are charged 2,689 grams of distilled water and 333 grams of pearl corn starch (10% moisture). The pH is adjusted to 2.75 with 6N hydrochloric acid followed by the addition of 10 milliliters of a ferrous ammonium sulfate solution containing 9.6 grams $Fe(NH_4)_2(SO_4)_2 \cdot 6H_2O$ per liter. While heating the slurry to 30° C., 300 grams of acrylonitrile are added. With the temperature at 30° C., 2.10 grams of ammonium persulfate (dissolved in 20 grams water) and 1.75 grams of sodium metabisulfite (dissolved in 20 grams water) are added. The polymerization initiates within 30 seconds and the ensuing exotherm raises the temperature to 60°–65° C. and is maintained there for one hour. At the end of one hour the contents of the reactor are cooled to room temperature.

B. Saponification

To a one gallon pressure reactor equipped with an agitator, thermometer and a pressure gauge are added 1,080 grams of the starch graft polymer slurry from Step A above, 217 grams distilled water, 1,714 grams anhydrous methanol and 175 grams of aqueous 50% sodium hydroxide. The mixture is heated to 100° C. and maintained at 100° C. for two hours. At the end of the two-hour mold, the resulting saponified mixture is cooled to room temperature. The product was recovered in anhydrous methanol, the pH adjusted to 7.8 with 12N hydrochloric acid, the slurry filtered and the wet cake dried overnight in a 60° C. vacuum oven.

EXAMPLE 4

A cross-linked starch graft polymer was prepared by the method set forth in Example 3 with the exception that 0.56 gram of N,N'-methylene-bis-acrylamide (N,N'-MBA) was added to the polymerization mixture when the temperature reached 60° C.

Using the above Modified Demand Absorbency Test the products of Examples 3 and 4 gave the following results:

| Example No. | % N,N'—MBA* | MDAT Values (g absorbed/g of superabsorbent at time | | | |
|---|---|---|---|---|---|
| | | Distilled Water | | Aqueous 1% NaCl (w/v) | |
| | | 0.25 min | 5 min | 0.25 min | 5 min |
| 3 | 0 | 157 | 178 | 53 | 58 |
| 4 | 0.188 | 161 | 176 | 53 | 58 |

*% based on monomer

The above results show that the introduction of cross-linkages into the saponified starch polyacrylonitrile graft copolymer had substantially no effect upon the absorbency characteristics of the finished product.

In contrast, Examples 1 (no cross-linking) and 2 (cross-linking) show the dramatic and unexpected improvement in absorbency characteristics obtained by introducing cross-linkages into the homopolymer.

EXAMPLE 5

A saponified cross-linked polyacrylonitrile product was prepared by the method set forth in Example 2 with the exception that 0.56 gram of N,N'-methylene-bis-acrylamide (N,N'-MBA) was added to the reactor before the polymerization was initiated and another 0.56 gram of N,N'-methylene-bis-acrylamide (each addition was 0.188% by weight based on monomer) was added to the polymerization mixture when the temperature reached 60° C.

EXAMPLE 6

A saponified cross-linked polyacrylonitrile product was prepared by the method set forth in Example 2 with the exception that 0.56 gram of N,N'-methylene-bis-acrylamide was added to the polymerization mixture prior to initiating the polymerization.

Using the Modified Demand Absorbency Test the products of Examples 5 and 6 gave the following results:

| Example No. | N,N'—MBA Additions* | MDAT - g liq. absorbed/ g polymer as is at time | | | |
|---|---|---|---|---|---|
| | | Distilled Water | | 1% Aqueous NaCl (w/v) | |
| | | 0.25 min | 5 min | 0.25 min | 5 min |
| 1 | 0 | 207 | 540 | 39 | 89 |
| 2 | 0.188% added at 60° C. | 377 | 582 | 60 | 105 |
| 5 | (1) 0.188% added prior to initiation | 437 | 514 | 95 | 130 |
| | (2) 0.188% added at 60° C. | | | | |
| 6 | 0.188% added prior to initiation | 411 | 513 | 82 | 108 |

*% based on monomer

The data show that addition of the cross-linking monomer is not limited to one mode and that the benefits in absorbency rates and total up-take derived from the mode of additions do vary somewhat which affords latitude in preparation of the absorbents.

EXAMPLE 7

A saponified cross-linked polyacrylonitrile product was prepared by the method set forth in Example 2 with the exception that 0.86 gram of divinylbenzene was used in place of the N,N'-methylene-bis-acrylamide.

EXAMPLE 8

A saponified cross-linked polyacrylonitrile product was prepared by the method set forth in Example 2 with the exception that 0.72 gram of ethylene glycol dimethacrylate was used in place of the N,N'-methylene-bis-acrylamide.

EXAMPLE 9

A saponified cross-linked polyacrylonitrile product was prepared by the method set forth in Example 2 with the exception that 1.23 grams of trimethylol propane trimethacrylate were used in place of N,N'-methylene-bis-acrylamide.

Evaluation of Examples 7 to 9 using the Modified Demand Absorbency Test gave the following results:

| Example No. | Cross-linking Monomer | MDAT - g liq. absorbed/g polymer as is at time | | | |
|---|---|---|---|---|---|
| | | Distilled Water | | 1% Aqueous NaCl (w/v) | |
| | | 0.25 min | 5 min | 0.25 min | 5 min |
| 1 | 0 | 207 | 540 | 39 | 89 |
| 2 | N,N'—MBA[1] | 377 | 582 | 60 | 105 |
| 7 | DVB[2] | 422 | 541 | 93 | 121 |
| 8 | EGDMA[3] | 302 | 526 | 87 | 124 |
| 9 | TMPTMA[4] | 399 | 500 | 90 | 110 |

[1] N,N'—methylene-bis-acrylamide
[2] divinylbenzene
[3] ethylene glycol dimethacrylate
[4] trimethylol propane trimethacrylate The results indicate that any type of cross-linking agent that lends itself to the vinyl polymerization process will work in the present invention whereby improved absorbency rates and total uptakes will result.

EXAMPLES 10–15

Examples 10 to 15 demonstrate the preparation of polymers according to the present invention by the procedure set forth in Example 2 using various levels of N,N'-methylene-bis-acrylamide (N,N'-MBA) based on the polyacrylonitrile. The absorbency characteristics of these products are tabulated below:

| Example No. | % N,N'—MBA* | MDAT - g liq. absorbed/g polymer as is at time | | | |
|---|---|---|---|---|---|
| | | Distilled Water | | 1% Aqueous NaCl (w/v) | |
| | | 0.25 min | 5 min | 0.25 min | 5 min |
| 1 | 0 | 207 | 540 | 39 | 89 |
| 10 | 0.188 | 377 | 582 | 60 | 105 |
| 11 | 0.219 | 403 | 536 | 78 | 105 |
| 12 | 0.250 | 481 | 598 | 85 | 108 |
| 13 | 0.313 | 387 | 488 | 88 | 112 |
| 14 | 0.375 | 431 | 502 | 94 | 123 |
| 15 | 0.437 | 415 | 546 | 80 | 115 |

*% based on monomer

The data indicates that improved absorbency rates and total up-takes can be obtained with various levels of N,N'-MBA wherein the N,N'-MBA is added after the polymerization has been initiated.

EXAMPLES 16–23

Examples 16 to 23 demonstrate the preparation of polymers according to the present invention by the procedure set forth in Example 6. The absorbency characteristics of these products are tabulated below:

| Example No. | % N,N'—MBA* | MDAT - g liq. absorbed/g polymer as is at time | | | |
|---|---|---|---|---|---|
| | | Distilled Water | | 1% Aqueous NaCl (w/v) | |
| | | 0.25 min | 5 min | 0.25 min | 5 min |
| 1 | 0 | 207 | 540 | 39 | 89 |
| 16 | 0.188 | 411 | 513 | 82 | 108 |
| 17 | 0.219 | 410 | 527 | 77 | 102 |
| 18 | 0.250 | 342 | 463 | 78 | 104 |
| 19 | 0.375 | 405 | 491 | 78 | 99 |
| 20 | 0.500 | 358 | 428 | 87 | 110 |
| 21 | 0.750 | 309 | 358 | 74 | 81 |
| 22 | 1.000 | 292 | 342 | 78 | 86 |
| 23 | 1.250 | 252 | 295 | 77 | 87 |

*% based on monomer

The data indicates that improved absorbency rates and total up-takes can be obtained with various levels of N,N'-MBA wherein the N,N'-MBA is added before the polymerization has been initiated.

EXAMPLES 24-30

Examples 24 to 30 illustrate the preparation of polymers in accordance with the present invention by the procedure set forth in Example 2 with the exception that a surfactant is added to the polymerization mixture prior to the polymerization initiation. The N,N'-methylene-bis-acrylamide level used was 0.250% based on the acrylonitrile. The absorbency characteristics of these products are shown below:

| Example No. | % N,N'—MBA* | Surfactant* | MDAT - g liq. absorbed/ g polymer as is at time | | | |
|---|---|---|---|---|---|---|
| | | | Distilled Water | | 1% Aqueous NaCl (w/v) | |
| | | | 0.25 min | 5 min | 0.25 min | 5 min |
| 1  | 0     | 0           | 207 | 540 | 39 | 89  |
| 24 | 0     | 3% Aerosol 22 | 143 | 561 | 47 | 111 |
| 25 | 0.250 | 3% Aerosol 22 | 129 | 564 | 48 | 118 |
| 26 | "     | 3% SIPEX EST | 264 | 451 | 63 | 98  |
| 27 | "     | 6% SIPEX EST | 184 | 512 | 56 | 98  |
| 28 | "     | 3% SPAN-20  | 392 | 431 | 82 | 94  |
| 29 | "     | 3% SPAN-40  | 448 | 540 | 82 | 104 |
| 30 | "     | 3% SPAN-60  | 474 | 553 | 94 | 112 |

*% based on monomer

The data indicates that surfactants improve the total absorbency of the polymers.

Those modifications and equivalents which fall within the spirit of the invention are to be considered a part thereof.

What is claimed is:

1. A process for preparing a composition capable of absorbing substantial quantities of liquids which comprises polymerizing at an acidic pH acrylonitrile or methacrylonitrile in the presence of about 0.03 to 5.0% by weight thereof of a polyfunctional monomeric cross-linking agent containing at least two polymerizable ethylenic groups per molecule, saponifying the resulting polymer with an aqueous alcoholic solution of an alkali base and recovering a granular, substantially water-insoluble liquid absorbing composition.

2. A process in accordance with claim 1 wherein the cross-linking agent is incorporated with the acrylonitrile or methacrylonitrile prior to initiation of polymerization.

3. A process in accordance with claim 1 wherein the cross-linking agent is incorporated with the acrylonitrile or methacrylonitrile subsequent to initiation of polymerization.

4. A process in accordance with claim 1 wherein an aqueous methanol solution of an alkali base is employed for saponification.

5. A process in accordance with claim 1 wherein the polymerization is conducted at an acidic pH and at a temperature of not more than about 100° C. for a period of not less than about 0.1 hour.

6. A process in accordance with claim 1 wherein the polymerization is conducted at an acidic pH and at a temperature of not more than about 80° C. for a period of not less than about 0.1 hour.

7. A process in accordance with claim 1 wherein a surfactant is employed in the polymerization.

8. A process in accordance with claim 7 wherein the surfactant is tetrasodium-N-(1,2-dicarboxyethyl)-N-octadecyl sulfosuccinamate.

9. A process in accordance with claim 1 wherein the cross-linking agent is N,N'-methylene-bis-acrylamide.

10. A process in accordance with claim 1 wherein the cross-linking agent is employed in an amount of about 0.05 to 2.0% by weight of acrylonitrile or methacrylonitrile.

11. A process in accordance with claim 1 wherein a polymerization initiator is employed.

12. A process in accordance with claim 11 wherein the polymerization initiator is a ceric salt.

13. A process in accordance with claim 11 wherein the polymerization initiator is a redox catalyst system including an oxidizing agent and a reducing agent.

14. A process in accordance with claim 13 wherein a multivalent metal ion is included to promote polymerization.

15. A process in accordance with claim 11 wherein the polymerization initiator comprises ammonium persulfate, sodium metabisulfite and ferrous ammonium sulfate.

16. A process for preparing a composition capable of absorbing substantial quantities of liquids which comprises:
  (1) forming an aqueous mixture containing from about 2 to 40% by weight acrylonitrile or methacrylonitrile,
  (2) adding to said aqueous mixture a polyfunctional monomeric cross-linking agent containing at least two polymerizable ethylenic groups per molecule prior to or subsequent to initiation of polymerization in an amount from about 0.03 to 5.0% by weight of acrylonitrile or methacrylonitrile,
  (3) adjusting the pH of the reaction mixture to pH 1-4,
  (4) adding to the acidic aqueous mixture a polymerization initiator,
  (5) allowing the polymerization reaction to proceed for a period of not less than about 0.1 hour at a temperature not above about 100° C., and
  (6) saponifying the recovered polymerized product with an aqueous alcoholic solution of a base.

17. A process in accordance with claim 16 wherein in step (1) the aqueous mixture contains from about 5 to 25% by weight acrylonitrile or methacrylonitrile.

18. A process in accordance with claim 16 wherein the cross-linking agent is employed in an amount of from about 0.05 to 2.0% by weight of acrylonitrile or methacrylonitrile.

19. A process in accordance with claim 16 wherein the cross-linking agent is N,N'-methylene-bis-acrylamide.

20. A process in accordance with claim 16 wherein the polymerization initiator is a redox catalyst system comprised of an oxidizing agent and a reducing agent.

21. A process in accordance with claim 16 wherein a multivalent metal ion polymerization promoter is added in an amount of from about 0.005 to 0.5% by weight based upon the acrylonitrile or methacrylonitrile.

22. A process in accordance with claim 16 wherein a surfactant is added to the mixture.

23. A substantially water-insoluble solid liquid-absorbing composition comprising an alkali metal salt of an aqueous alcoholic alkali saponified cross-linked homopolymer of acrylonitrile or methacrylonitrile.

24. A composition in accordance with claim 23 wherein the homopolymer of acrylonitrile or methacrylonitrile is cross-linked with N,N'-methylene-bis-acrylamide.

25. A composition in accordance with claim 23 wherein the liquid-absorbing composition is an alkali metal salt of an aqueous methanolic alkali saponified cross-linked homopolymer of acrylonitrile or methacrylonitrile.

* * * * *